US010511178B2

(12) United States Patent
Zimmanck

(10) Patent No.: US 10,511,178 B2
(45) Date of Patent: Dec. 17, 2019

(54) AUTONOMOUS CHARGE BALANCING OF DISTRIBUTED AC COUPLED BATTERIES WITH DROOP OFFSET

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 178 days.

(21) Appl. No.: 15/369,876

(22) Filed: Dec. 5, 2016

(65) Prior Publication Data
US 2017/0163049 A1 Jun. 8, 2017

Related U.S. Application Data

(60) Provisional application No. 62/262,696, filed on Dec. 3, 2015.

(51) Int. Cl.
| | |
|---|---|
| H02J 7/00 | (2006.01) |
| H02J 7/14 | (2006.01) |
| H02J 7/35 | (2006.01) |
| H02J 3/32 | (2006.01) |
| H02J 13/00 | (2006.01) |

(52) U.S. Cl.
CPC .............. *H02J 7/0019* (2013.01); *H02J 3/32* (2013.01); *H02J 7/0021* (2013.01); *H02J 7/0045* (2013.01); *H02J 7/35* (2013.01); *H02J 13/002* (2013.01); *Y02E 40/72* (2013.01); *Y02E 60/722* (2013.01); *Y02E 60/7815* (2013.01); *Y04S 10/123* (2013.01); *Y04S 10/14* (2013.01); *Y04S 40/121* (2013.01)

(58) Field of Classification Search
USPC ........ 320/101, 112, 113, 114, 115, 116, 117, 320/118, 119, 120, 121, 122, 124, 125, 320/128, 107, 134, 135, 137, 160, 166, 320/109
See application file for complete search history.

(56) References Cited

U.S. PATENT DOCUMENTS

| | | | |
|---|---|---|---|
| 6,362,540 B1 * | 3/2002 | Hill | H02J 1/10 307/24 |
| 9,948,097 B2 * | 4/2018 | Aulagnier | G06Q 50/06 |

(Continued)

OTHER PUBLICATIONS

Pogaku et al., "Modeling, Analysis and Testing of Autonomous Operation of an Inverter-Based Microgrid", IEEE Transactions on Power Electronics, vol. 22, Issue 2, pp. 613-625, Mar. 2007.
Brabandere et al., "Control of Microgrids", IEEE Power Engineering Society General Meeting, pp. 8, Jun. 24-28, 2007.
Brabandere et al., "A Voltage and Frequency Droop Control Method for Parallel Inverters", IEEE Transactions on Power Electronics, vol. 22, Issue 4, pp. 1107-1115, Jul. 2007.

(Continued)

*Primary Examiner* — Alexis B Pacheco
(74) *Attorney, Agent, or Firm* — Moser Taboada; Leonard Linardakis

(57) ABSTRACT

A system and apparatus for autonomous charge balancing of an energy storage device of the microgrid. In one embodiment the apparatus comprises the energy storage device; and a power conditioner, coupled to the energy storage device, comprising a droop control module for operating the power conditioner, during an autonomous mode of operation, such that the state of charge of the energy storage device is autonomously driven toward the state of charge of at least one other energy storage device of the microgrid.

20 Claims, 6 Drawing Sheets

(56) References Cited

U.S. PATENT DOCUMENTS

| | | | |
|---|---|---|---|
| 9,960,637 B2* | 5/2018 | Sanders | H02J 3/381 |
| 2004/0051387 A1 | 3/2004 | Lasseter et al. | |
| 2011/0266871 A1* | 11/2011 | Thisted | H02J 7/34 |
| | | | 307/46 |
| 2012/0119573 A1* | 5/2012 | Turudic | B60L 7/14 |
| | | | 307/10.1 |
| 2012/0267952 A1 | 10/2012 | Ballatine et al. | |
| 2013/0073109 A1 | 3/2013 | Cheng et al. | |
| 2014/0184162 A1* | 7/2014 | Takahashi | H02J 7/007 |
| | | | 320/128 |
| 2014/0184172 A1* | 7/2014 | Momo | H02J 7/0057 |
| | | | 320/160 |
| 2014/0342219 A1* | 11/2014 | Takahashi | H01M 10/058 |
| | | | 429/178 |
| 2015/0021998 A1* | 1/2015 | Trescases | H02J 3/385 |
| | | | 307/46 |
| 2015/0115910 A1* | 4/2015 | Jiang | H02M 3/1584 |
| | | | 323/271 |
| 2015/0214754 A1 | 7/2015 | Choi et al. | |
| 2015/0249363 A1 | 9/2015 | Humphrey et al. | |
| 2015/0333512 A1* | 11/2015 | Saussele | H02S 10/20 |
| | | | 700/287 |
| 2016/0105042 A1* | 4/2016 | Taylor | H01M 10/128 |
| | | | 320/134 |
| 2016/0134108 A1* | 5/2016 | Hung | H02J 1/04 |
| | | | 307/60 |
| 2017/0176965 A1* | 6/2017 | Martin Lloret | G06Q 10/06 |

OTHER PUBLICATIONS

Sao et al., "Control and Power Management of Converter Fed Microgrids", IEEE Transactions on Power Systems, vol. 23, Issue 3, pp. 1088-1098, Aug. 2008.

Iyer et al., "A Generalized Computational Method to Determine Stability of a Multi-inverter Microgrid", IEEE Transactions on Power Electronics, vol. 25, Issue 9, pp. 2420-2432, Sep. 2010.

Vasquez et al., "Adaptive Droop Control Applied to Voltage-Source Inverters Operating in Grid-Connected and Islanded Modes", IEEE Transactions on Industrial Electronics, vol. 56, Issue 10, pp. 4088-4096, Oct. 2009.

Majumder et al., "Droop Control of Converter-Interfaced Microsources in Rural Distributed Generation", IEEE Transactions on Power Delivery, vol. 25, Issue 4, pp. 2768-2778, Oct. 2010.

Yao et al., "Design and Analysis of the Droop Control Method for Parallel Inverters Considering the Impact of the Complex Impedance on the Power Sharing", IEEE Transactions on Industrial Electronics, vol. 58, Issue 2, pp. 576-588, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, pp. 689-701, Mar. 2011.

Rocabert et al., "Control of Power Converters in AC Microgrids", IEEE Transactions on Power Electronics, vol. 27, Issue 11, pp. 4734-4749, Nov. 2012.

International Search Report and Written Opinion dated Mar. 17, 2017 for PCT Application No. PCT/US2016/064896.

* cited by examiner

AUTONOMOUS CHARGE BALANCING OF DISTRIBUTED AC COUPLED BATTERIES WITH DROOP OFFSET

CROSS-REFERENCE TO RELATED APPLICATIONS

This application claims benefit of U.S. provisional patent application Ser. No. 62/262,696, entitled "Autonomous Charge Balancing of Distributed AC Coupled Batteries with Droop Offset" and filed Dec. 3, 2015, which is herein incorporated in its entirety by reference.

BACKGROUND OF THE INVENTION

Field of the Invention

Embodiments of the present disclosure relate generally to charge balancing of batteries and, more particularly, to autonomous charge balancing of AC coupled batteries in a microgrid.

Description of the Related Art

A conventional microgrid generally comprises at least one energy generator, at least one energy storage device, and at least one energy load. When disconnected from a conventional utility grid, a microgrid can generate power as an intentional island without imposing safety risks on any line workers that may be working on the utility grid.

Droop control is one technique that may be used for operating energy storage and generation resources in a microgrid that is disconnected from the utility grid. For several batteries in a microgrid having the same droop characteristics, the batteries will share power equally among each other, or proportional to their power rating. Due to small differences in chemistry, manufacturing tolerances, and the like, the batteries won't charge and discharge at exactly the same rate. In conventional microgrids that rely on communication between microgrid resources when operating in an islanded state, such communication can be used to ensure that the charge among the batteries is balanced. However, if the microgrid communication is interrupted or disabled, the differences among the batteries will cause the batteries to drift apart and the charge among the batteries to become unbalanced.

Therefore, there is a need in the art for a technique for autonomous charge balancing among batteries in a droop-controlled microgrid.

SUMMARY OF THE INVENTION

Embodiments of the present invention generally relate to autonomous charge balancing among batteries in a droop-controlled microgrid as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
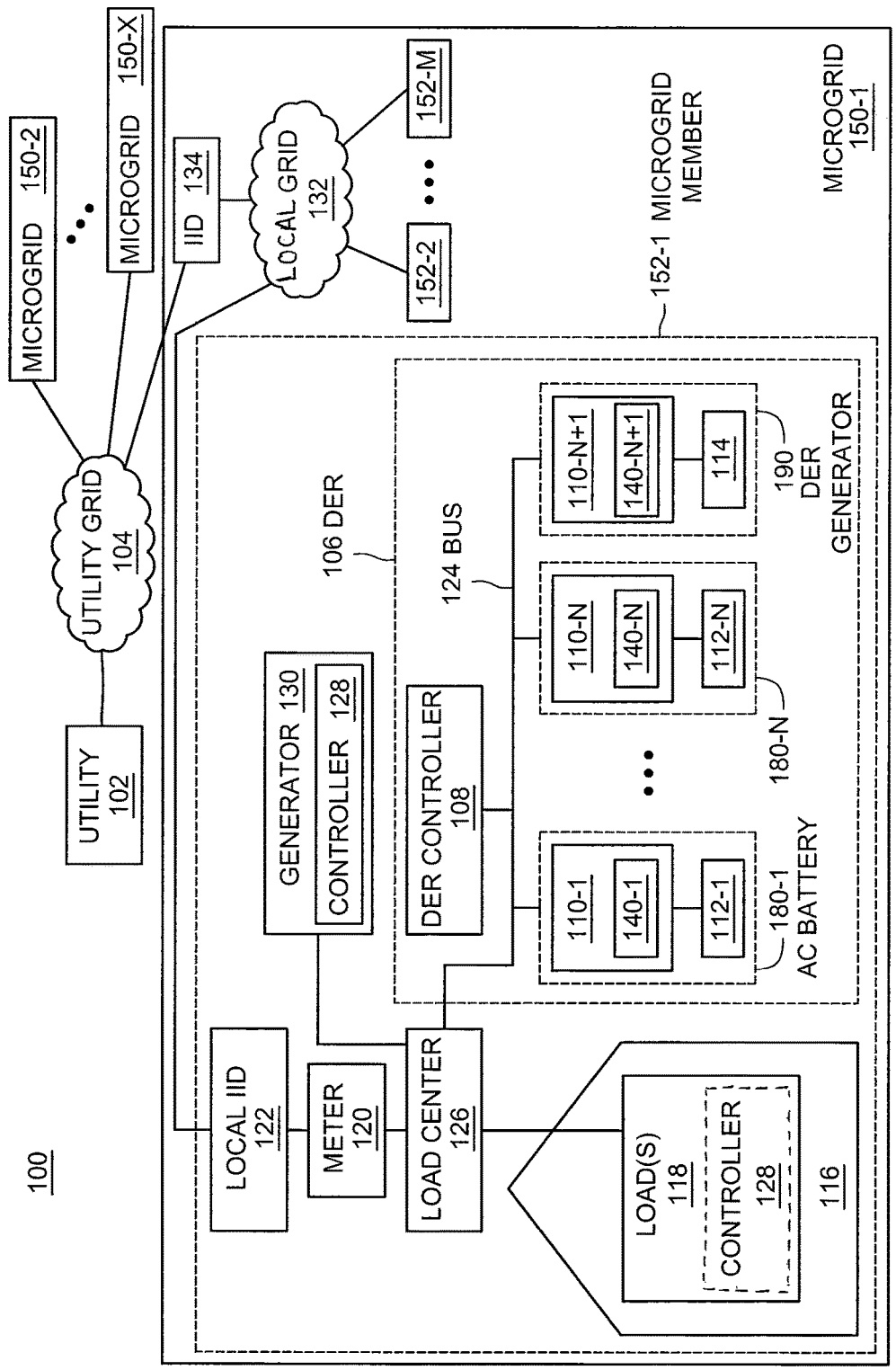
FIG. 1 is a block diagram of a power system in accordance with one or more embodiments of the present invention.

FIG. 1 is a block diagram of a power system 100 in accordance with one or more embodiments of the present invention. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, . . . , 150-X (collectively referred to as microgrids 150) coupled to the utility 102 via a utility grid 104. Through their connections to the utility grid 104, each microgrid 150 as a whole may receive energy from the utility grid 104 or may place energy onto the utility grid 104. In some embodiments, coupling energy to a commercial utility grid is strictly controlled by regulation and it is beneficial that the microgrids 150 maintain or strive to maintain a zero energy output policy. Each microgrid 150 is capable of operating without energy supplied from the utility 102 and may cover a neighborhood, a village, a small city, or the like, as the term "microgrid" is not intended to imply a particular system size.

Although the microgrid 150-1 is depicted in detail in FIG. 1 and described herein, the microgrids 150-2 through 150-X are analogous to the microgrid 150-1. However, the number and/or type of various microgrid components may vary among the microgrids 150.

The microgrid 150-1 comprises a plurality of microgrid members 152-1, 152-2, . . . , 152-M (collectively referred to as microgrid members 152) coupled to a local grid 132 which in turn is coupled to the utility grid 104 via an island interconnect device (IID) 134. The local grid 132 may be a trunk of the utility grid 104 or it may be a specifically designed local grid for the microgrid 150-1.

The IID 134 determines when to disconnect/connect the microgrid 150-1 from/to the utility grid 104 and performs the disconnection/connection. Generally, the IID 134 comprises a disconnect component (e.g., a disconnect relay) along with a CPU (not shown) and an islanding module (not shown) and monitors the utility grid 104 for failures or disturbances, determines when to disconnect from/connect to the utility grid 104, and drives the disconnect component accordingly. For example, the IID 134 may detect a fluctuation, disturbance or outage with respect to the utility grid 104 and, as a result, disconnect the microgrid 150-1 from the utility grid 104. The IID 134 may also disconnect the microgrid 150-1 from the utility grid 104 when the microgrid 150-1 is either overproducing energy or overloading the utility grid 104. Once disconnected from the utility grid 104, the microgrid 150-1 can continue to generate power as an intentional island without imposing safety risks on any line workers that may be working on the utility grid 104. In some embodiments, the IID 134 may receive instructions from another component or system for disconnecting from/connecting to the utility grid 104.

The microgrid member 152-1 comprises a building 116 (e.g., a residence, commercial building, or the like) coupled to a load center 126 which may be within or outside of the building 116. The load center 126 is coupled to the local grid 132 via a utility meter 120 and a local IID 122, and is further coupled to a distributed energy resource (DER) 106, a generator 130, and one or more loads 118 for coupling power among these components. Although the microgrid member 152-1 is depicted in detail in FIG. 1 and described herein, the microgrid members 152-2 through 152-M are analogous to the microgrid member 152-1. However, the number and/or types of various microgrid member components may vary among the microgrid members 152.

The local IID 122 determines when to disconnect/connect the microgrid member 152-1 from/to the local grid 132 and performs the disconnection/connection. For example, the local IID 122 may detect a grid fluctuation, disturbance or outage and, as a result, disconnect the microgrid member 152-1 from the local grid 132. The IID 122 may also disconnect the microgrid member 152-1 from the local grid 132 when the microgrid member 152-1 is either overproducing energy or overloading the local grid 132. Once disconnected from the local grid 132, the microgrid member 152-1 can continue to generate power as an intentional island without imposing safety risks on any line workers that may be working on the local grid 132. The local IID 122 comprises a disconnect component (e.g., a disconnect relay) for physically disconnecting from/connecting to the local grid 132. The local IID 122 may additionally comprise a CPU (not shown) and an islanding module (not shown) for monitoring grid health, detecting grid failures and disturbances, determining when to disconnect from/connect to the local grid 132, and driving the disconnect component accordingly. In some embodiments, the local IID 122 may receive instructions from another component or system for disconnecting from/connecting to the local grid 132.

The meter 120 measures the ingress and egress of energy for the microgrid member 152-1; in some embodiments, the meter 120 comprises the IID 122 or a portion thereof. The meter 120 generally measures real power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 152.

The generator 130 is an energy generator, such as a diesel generator, that automatically increases or curtails energy output depending on the needs of the microgrid member 152-1. The generator 130 comprises a component controller 128, described in detail further below with respect to FIG. 5. The component controller 128 may optimize the operation of the generator 130 with respect to the microgrid member 152-1 and/or the microgrid 150-1 (e.g., by generating control instructions for the generator 130); implement control instructions for operating the generator 130 (e.g., instructions received from another component or system); obtain data pertaining to the generator 130 (e.g., performance data, operational data, or the like) which may further be communicated to another component or system; or perform similar functions.

The loads 118 consume energy obtained via the load center 126 and may be located inside of the building 116 or outside of the building 116. Some of the loads 118 may be "smart loads" that comprise a corresponding component controller 128 for optimizing the utilization of energy (e.g., disconnecting/connecting the smart load 118 when the grid is overloaded/underloaded, modulating operation of smart loads 118, such as HVAC, pumps, and the like, as needed); implementing control instructions for the load 118 (e.g., instructions received from another component or system); obtaining data pertaining to the loads 118 (e.g., performance data, operational data, and the like) which may further be communicated to another component or system; or performing similar functions.

One or more of the smart loads 118 may be an energy storage component that stores energy received via the load center 126, such as a hot water heater, an electric car, or the like. Such energy storage loads 118 may further deliver stored energy to other loads 118 and/or the local grid 132 as needed, where the energy storage and delivery is controlled by the corresponding component controller 128.

The DER 106 comprises power conditioners 110-1 . . . 110-N, 110-N+1 coupled in parallel to a bus 124 that is further coupled to the load center 126. Generally the power conditioners 110 are bi-directional power conditioners and those power conditioners 110 in a first subset of power conditioners 110 are coupled to DC energy sources 114 (for example, renewable energy sources such as wind, solar, hydro, and the like) while the power conditioners 110 in a second subset of power conditioners 110 are coupled to energy storage devices 112 as described below. The combination of a DC energy source 114 and a corresponding power conditioner 110 may be referred to herein as a DER generator. In embodiments where the power conditioners 110 are DC-AC inverters, a power conditioner 110 and a corresponding energy storage device 112 may together be referred to herein as an AC battery 180; in embodiments where the power conditioners 110 are DC-DC converters, a power conditioner 110 and a corresponding energy storage device 112 may together be referred to herein as a battery DC supply.

In the embodiment depicted in FIG. 1, the power conditioners 110-1 . . . 110-N are respectively coupled to energy storage devices 112-1 . . . 112-N to form a plurality of AC batteries 180-1 . . . 180-N, respectively. The AC battery power conditioners 110 convert AC power from the bus 124 to energy that is stored in the corresponding energy storage devices 112, and can further convert energy from the corresponding energy storage devices 112 to commercial power grid compliant AC power that is coupled to the bus 124. An energy storage device 112 may be any suitable energy storage device having a "charge level", such as a battery, flywheel, compressed air storage, or the like, that can store energy and deliver the stored energy.

As further depicted in FIG. 1, the power conditioner 110-N+1 is coupled to a DC energy source 114 (e.g., a renewable energy source such as wind, solar, hydro, and the like), forming a DER generator, for receiving DC power and generating commercial power grid compliant AC power that is coupled to the bus 124. In one or more embodiments, the DC energy source 114 is a photovoltaic (PV) module.

Although a single DER generator 190 is depicted in FIG. 1, other embodiments may comprise fewer for more DER generators 190. In certain embodiments, multiple DC energy sources 114 are coupled to a single power conditioner 110 (e.g., a single, centralized power conditioner). In one or more alternative embodiments, the power conditioners 110 are DC-DC converters that generate DC power and couple the generated power to a DC bus (i.e., the bus 124 is a DC bus in such embodiments). In such embodiments, the power conditioners 110-1 through 110-N also receive power from the DC bus and convert the received power to energy that is then stored in the energy storage device 112.

Each of the power conditioners 110 comprises a power conditioner controller 140 (described in detail further below) having a droop control module for implementing droop control techniques that allow the power conditioners 110 to share the load in a safe and stable manner when the microgrid member 152-1 is disconnected from the utility 102 or the local grid 132.

The DER 106 comprises a DER controller 108 that is coupled to the bus 124 and communicates with the power conditioners 110 (e.g., via power line communications (PLC) and/or other types of wired and/or wireless techniques). The DER controller 108 may send command and control signals to one or more of the power conditioners 110 and/or receive data (e.g., status information, performance data, and the like) from one or more of the power conditioners 110. In some embodiments, the DER controller 108 is further coupled, by wireless and/or wired techniques, to a master controller or gateway (not shown) via a communication network (e.g., the Internet) for communicating data to/receiving data from the master controller (e.g., performance information and the like).

In certain embodiments, the DER controller 108 comprises the local IID 122 or a portion of the local IID 122. For example, the DER controller 108 may comprise an islanding module for monitoring grid health, detecting grid failures and disturbances, determining when to disconnect from/connect to the local grid 132, and driving a disconnect component accordingly, where the disconnect component may be part of the DER controller 108 or, alternatively, separate from the DER controller 108. In some embodiments, the DER controller 108 may coordinate with the local IID 122, e.g., using power line communications.

Although the microgrid member 152-1 is depicted as having a single DER 106 in FIG. 1, in other embodiments the microgrid member 152-1 may have additional DERs. In one or more alternative embodiments, the DER control 108 and the DER generators are absent from the microgrid member 152-1 and the DER comprises only one or more AC batteries 180.

Each of the power conditioners 110, the generator 130, and any smart loads 118 are droop-controlled such that when the microgrid member 152-1 is disconnected from the local grid 132 or the utility grid 104 (e.g., using the IID 122 and/or the IID 134) and operating in an autonomous mode, these components employ a droop control technique for parallel operation without the need for any common control circuitry or communication among the components.

In accordance with one or more embodiments of the present invention, the AC battery power conditioners 110 each employ a droop offset proportional to the state of charge of the corresponding energy storage device 112 in order to maintain equal relative states of charge among the AC batteries 180 during autonomous operation. For each AC battery 180, the droop offset is added to the power term within the power conditioner's droop control module and varies (where a positive power corresponds to power being exported from the DER) with the state of charge of the corresponding energy storage device 112, causing energy to flow from those AC batteries 180 having higher states of charge into those AC batteries 180 with lower states of charge without disrupting the fundamental stability of the droop control. Such operation autonomously drives the power storage devices 112 toward equal (or substantially equal) states of charge.

For example, if a particular AC battery 180 has a state of charge at 50%, that AC battery 180 operates with its normalized droop function. If that AC battery 180 has a state of charge that is below 50%, its droop will be pushed down proportional to its deviation from 50%, forcing the AC battery 180 to run at a power level offset in the charging direction; i.e., if the battery 180 would have been charging, it is now charging at a higher rate, and if it would have been discharging, it will be discharging at a lower rate. Conversely, if the state of charge is over 50% the droop is slightly pushed up proportional to its deviation from 50%, causing the AC battery 180 to begin operating at a power level offset in the discharging direction; i.e., if the battery would have been charging, it is now charging at a lower rate and if it would have been discharging, it will now discharge at a higher rate. As a result of such a droop offset, those AC batteries 180 that have slightly different states of charge will have their droops offset slightly in different directions, resulting in a small amount of power that flows between the AC batteries 180 to equalize them.

The droop offset described herein may be employed in a variety of different types of droop control, including droop control for voltage forming inverters (as described below with respect to FIG. 3) and droop control for current feeding inverters, which may also be referred to as "inverse droop" (as described below with respect to FIG. 4).

Figure 2:
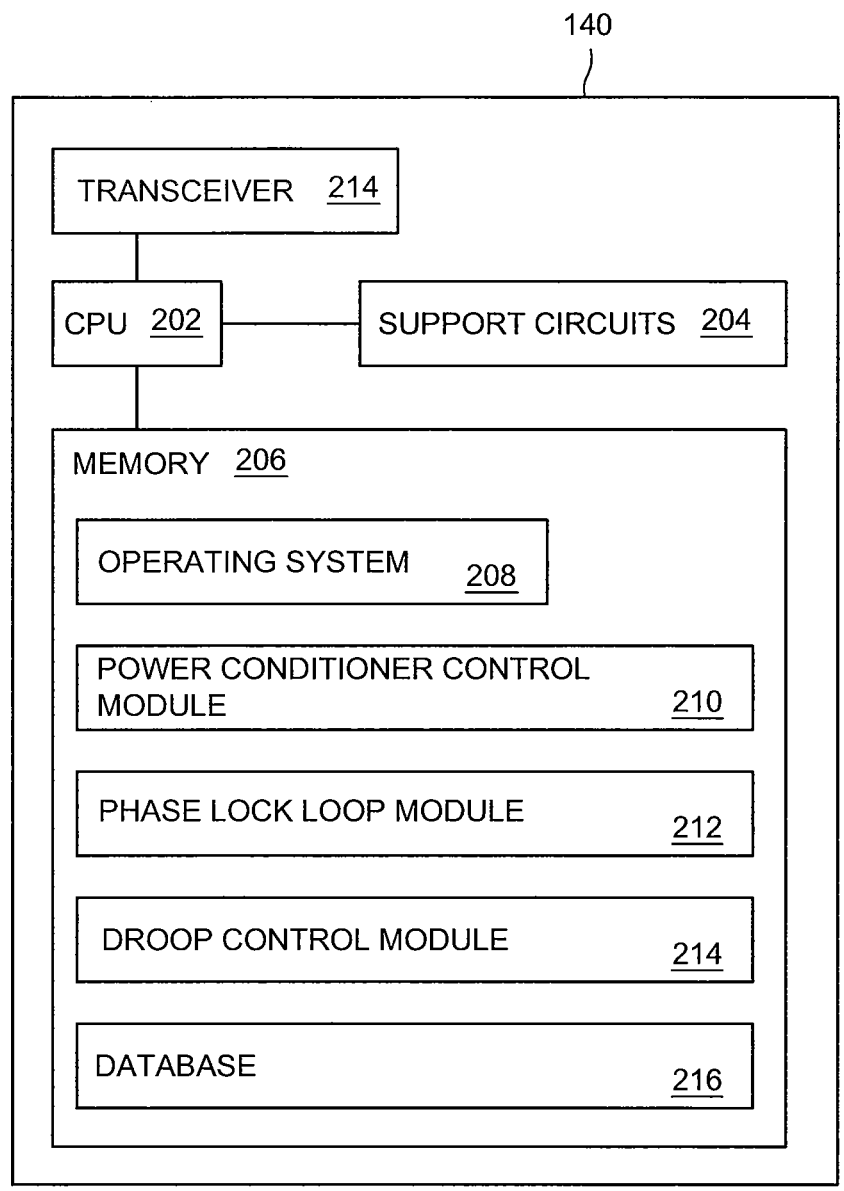
FIG. 2 is a block diagram of a power conditioner controller in accordance with one or more embodiments of the present invention.

FIG. 2 is a block diagram of a power conditioner controller 140 in accordance with one or more embodiments of the present invention. The power conditioner controller 140 comprises a transceiver 224, support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The power conditioner controller 140 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The transceiver 224 may be coupled to the power conditioner's output lines for communicating with the DER controller 108 and/or other power conditioners 110 using power line communications (PLC). Additionally or alternatively, the transceiver 224 may communicate with the DER controller 108 and/or other power conditioners 110 using other type of wired communication techniques and/or wireless techniques.

The support circuits 204 are well known circuits used to promote functionality of the CPU 202. Such circuits include, but are not limited to, a cache, power supplies, clock circuits, buses, input/output (I/O) circuits, and the like.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the power conditioner controller 140 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a power conditioner control module 210 and a phase lock loop module 212 for controlling, when executed, power conversion by the power conditioner 110, and a droop control module 214 for employing, when executed, droop control techniques as described herein. The functionality of the droop control module 214 is described below with respect to FIGS. 3 and 4. The droop control module 214, when executed, operates in real-time or near real-time such that the corresponding energy storage device 112 autonomous charge balances with respect to the remaining energy storage devices 112.

The memory 206 additionally stores a database 216 for storing data related to the operation of the power conditioner 110 and/or the present invention. In various embodiments, one or more of the power conditioner control module 210, the phase lock loop module 212, the droop control module 214, and the database 222, or portions thereof, are implemented in software, firmware, hardware, or a combination thereof.

Figure 3:
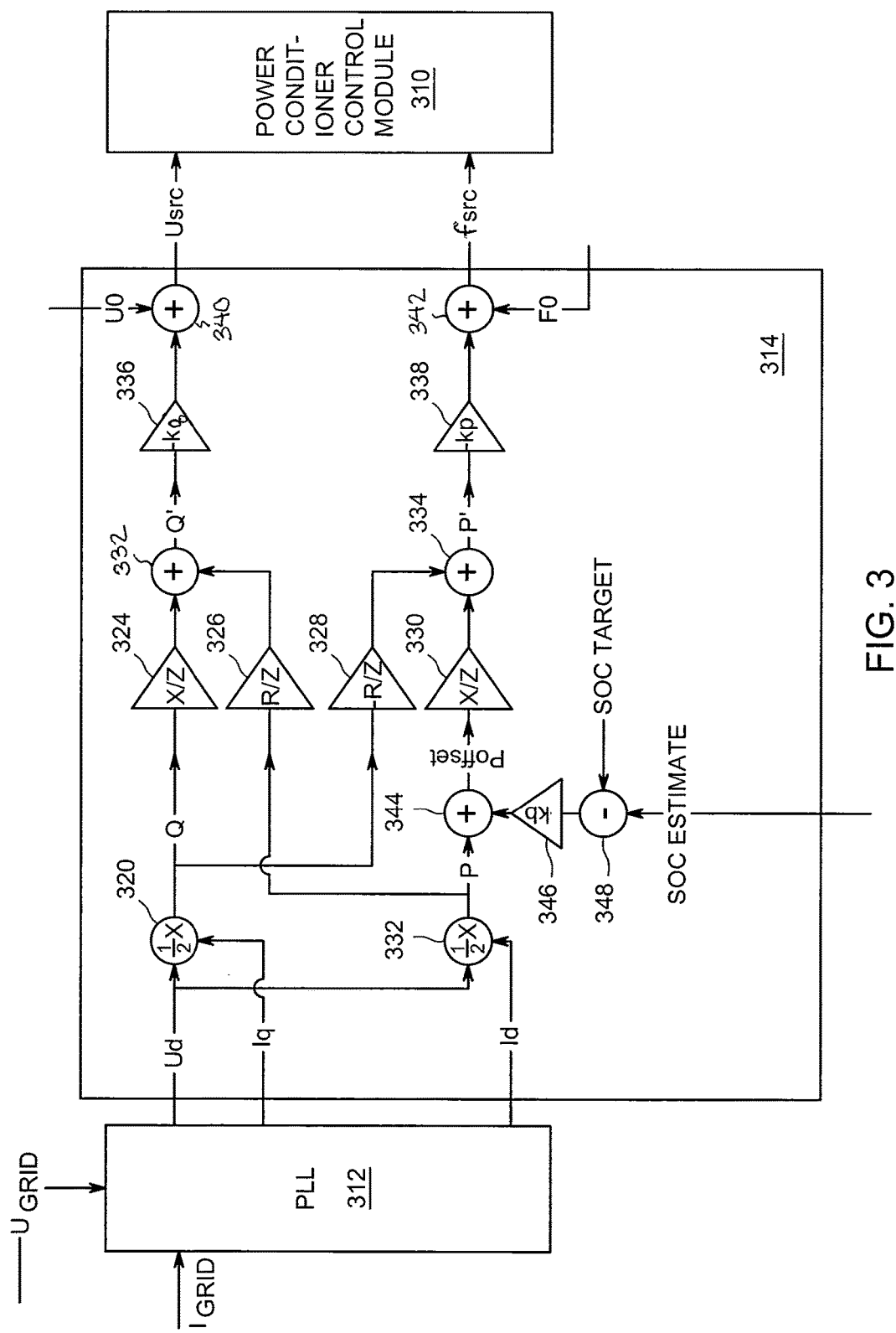
FIG. 3 is a block diagram of a droop control module in accordance with one or more embodiments of the present invention.

FIG. 3 is a block diagram of a droop control module 314 in accordance with one or more embodiments of the present invention. As shown in FIG. 3, the droop control module 314 (an implementation of the droop control module 214) is coupled between a PLL module 312 (an implementation of the PLL module 212) and a power conditioner control module 310 (an implementation of the power conditioner control module 210). The droop control module 314 depicted in FIG. 3 provides droop control for voltage forming inverters—i.e., in those embodiments where the power conditioners 110 comprise the droop control module 314, the power conditioners 110 are voltage forming inverters.

The droop control module 314 comprises multipliers 320 and 322, adders 332, 334, 340, 342 and 344, subtractor 348, and gain constant multipliers 324, 326, 328, 330, 336, and 338. During autonomous mode operation of the power conditioner 110, the grid voltage Ugrid and the current being coupled to the grid by the power conditioner 110, Igrid, are fed to the PLL 312. Using the grid voltage Ugrid as a reference, the PLL 312 generates signals Id and Iq, where Id represents the amplitude of the portion of the grid current Igrid that is in-phase with the grid voltage Ugrid and Iq represents the portion of the grid current Igrid that is orthogonal to the grid voltage Ugrid, and couples the signals Id and Iq to the multipliers 322 and 320, respectively. The PLL 312 further generates the signal Ud which represents the peak value of the fundamental of the grid voltage Ugrid and couples the signal Ud to the multipliers 320 and 322.

The multiplier 320 multiplies $\frac{1}{2}Ud*Iq$ to generate the signal Q representing the reactive power component, and couples the signal Q to the gain constant multipliers 324 and 328. The multiplier 322 multiples $\frac{1}{2}Ud*Id$ to generate the signal P representing the real power component, and couples the signal P to the adder 344 and to the gain constant multiplier 326.

The droop control module 314 receives a signal SOC representing an estimate of the current state of charge of the energy storage device 112 coupled to the power conditioner 110. Generally, the signal SOC is acquired from a state of charge (SOC) estimator embedded in the energy storage device 112 (e.g., the signal SOC may be obtained from a battery management unit of a battery 112 via an application programming interface API), although in some alternative embodiments the SOC estimator may be part of the power conditioner 110. The received signal SOC is coupled to the subtractor 348.

The subtractor 348 further receives a signal SOC target that represents a target value for a state of charge for the energy storage device 112. The SOC target value is predetermined and is the same for each of the batteries 112 within a particular microgrid member 152 in order for the charge between the batteries 112 to autonomously equalize. In some embodiments, the SOC target value may be 50% state of charge such that, under normal conditions, all the batteries 112 within a particular microgrid member 152 are biased towards their 50% state of charge in order to optimize the balance between the batteries 112 being able to absorb excess power generated and to generate power when needed. In some other embodiments where the ability to power certain loads has a higher priority than being able to store excess generated power, the SOC target may be set at a value much greater than 50%.

The output from the subtractor 348 is coupled to the gain constant multiplier 346, which has a gain constant of $-kb$ which essentially determines the drift of the corresponding energy storage device 112. Generally the value of kb is extremely small to prevent the SOC estimation from significantly affecting the dynamic characteristics of the power conditioner 110. For example, if one energy storage device 112 within a microgrid member 152 is undercharged with respect to the other energy storage devices 112 (e.g., the other energy storage devices are 75% charged), it is desirable to have the one undercharged energy storage device 112 charge slightly faster or discharge slightly slower such that it slowly converges to the state of charge of the other energy storage devices 112. In some embodiments where the power rating for the power conditioner 110 is ¼ of the KWH rating of the corresponding energy storage device 112 and the power conditioner 110 is 300 W conditioner, the value of kb may be 0.25 Watts/% for a 20% SOC difference and a desired 5 W difference in power between the energy storage devices 112 (i.e., 5 W/20%). In some other embodiment, the value of kb may be even smaller, for example 0.1 W/%.

The output from the gain constant multiplier 346 is a signal representing an SOC-based droop offset that is proportional to the state of charge of the corresponding energy storage device 112. The SOC-based droop offset signal is coupled to the adder 344 for addition to the power term P. The resulting output signal from the adder 344, Poffset, is coupled to the gain constant multiplier 330.

The gain constant multipliers 324, 326, 328, and 330 have respective gain constants X/Z, R/Z, −R/Z, and X/Z, where R, X and Z are impedance terms that are generally matched to the grid impedance at their point of common coupling, although they may be set using other techniques. In some embodiments where the grid impedance is mostly resistive, a typical value for X/Z may be on the order of 0.1, and a typical value for R/Z may be on the order of 10.0. In other embodiments where the grid impedance is mostly inductive, a typical value for X/Z may be on the order of 10.0 and a typical value for R/Z may be on the order of 0.1. Generally, X/Z and R/Z ranges from 0.1-10.0, although the range may vary depending on the type of system to which the power conditioners 110 are coupled.

The outputs from the gain constant multipliers 324 and 326 are coupled to the adder 332; the adder 332 generates the signal Q' (which represents the modified reactive power) and couples Q' to the gain constant multiplier 336. The gain constant multiplier 336 has a gain constant −kq, which is a reactive power droop gain depending on the size of the power conditioner 110 (i.e., depending on the amount of reactive power the power conditioner can deliver). In some embodiments where the system is a 240V system and the maximum reactive power delivery is 100 var, kq may have a value of 0.24V/var to minimize the voltage drop to +/−10%.

The output from the gain constant multiplier 336 is coupled to the adder 340, along with a signal U0 that represents the target nominal voltage of the system (e.g., 240V AC or 230V AC). The output signal from the adder 340 is a signal Usrc representing the peak AC operating voltage for the power conditioner 110; the signal Usrc is coupled to the power conditioner control module 310 for use by the power conditioner control module 310 in generating the output from the power conditioner 110.

The outputs from the gain constant multipliers 328 and 330 are coupled to the adder 334; the adder 334 generates the signal P' (which represents the modified real power) and couples P' to the gain constant multiplier 338. The gain constant multiplier 338 has a gain constant −kp, which is a real power droop gain depending on the size of the power conditioner 110 (i.e., depending on the amount of real power the power conditioner can deliver). In some embodiments where the power conditioner 110 is a 300 W power conditioner operating at a frequency of 60 Hz, the value of kp is set at 0.01 Hz/W for a 5% droop. The output from the gain constant multiplier 338 is coupled to the adder 342.

The output from the gain constant multiplier 338 is coupled to the adder 342, along with a signal f0 that represents the target nominal frequency of the system (60 Hz or 50 Hz). The output signal from the adder 342 is a signal fsrc representing the AC operating frequency for the power conditioner 110; the signal fsrc is coupled to the power conditioner control module 310 for use by the power conditioner control module 310 in generating the output from the power conditioner 110.

In some alternative embodiments, a computer readable medium comprises a program that, when executed by a processor, performs the steps described with respect to FIG. 3 for determining the power conditioner droop control such that autonomous charge balancing of the energy storage devices 112 is achieved.

Figure 4:
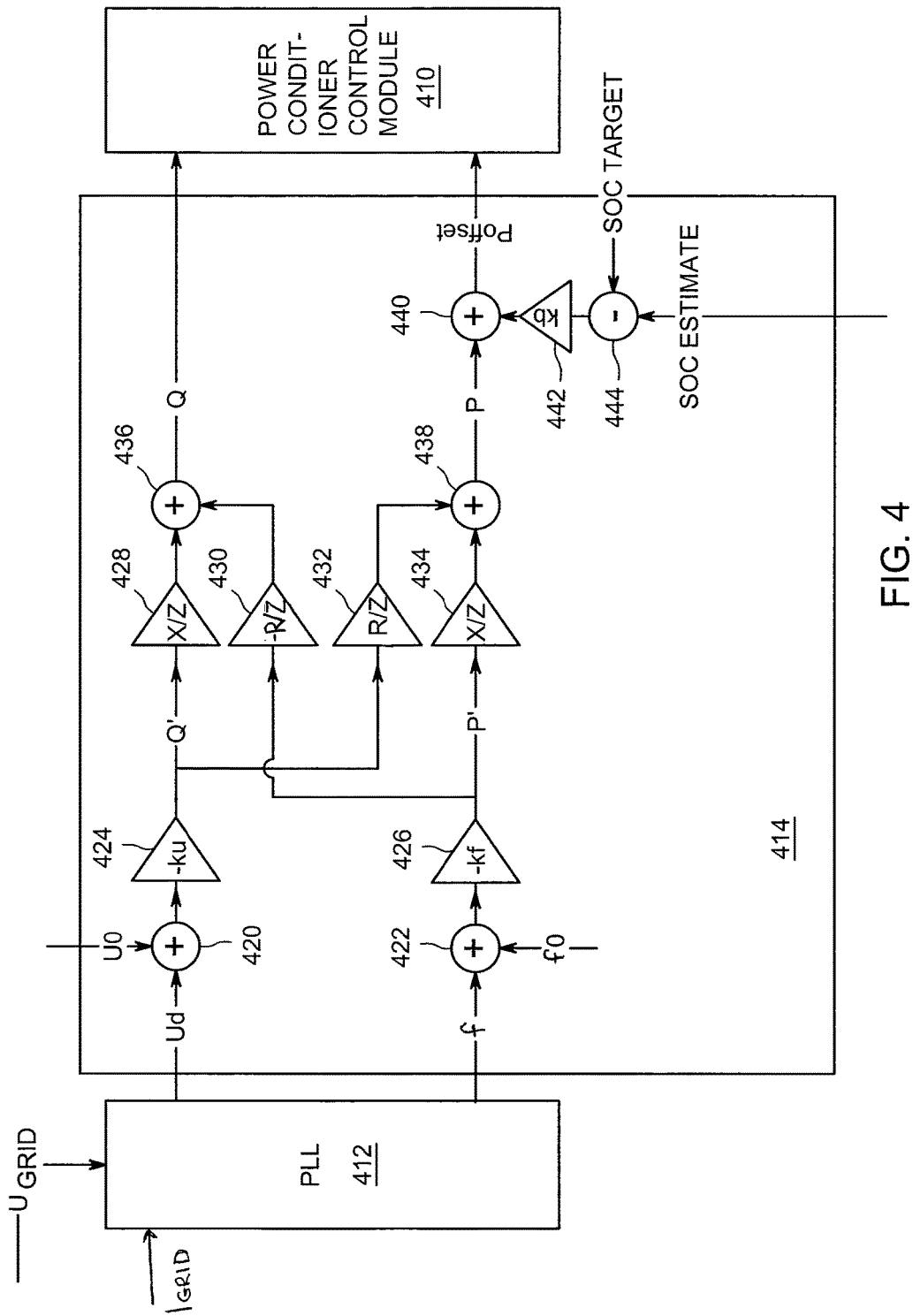
FIG. 4 is a block diagram of a droop control module in accordance with one or more embodiments of the present invention.

FIG. 4 is a block diagram of a droop control module 414 in accordance with one or more embodiments of the present invention. As shown in FIG. 4, the droop control module 414 (an implementation of the droop control module 214) is coupled between a PLL module 412 (an implementation of the PLL module 212) and a power conditioner control module 410 (an implementation of the power conditioner control module 210). The droop control module 414 depicted in FIG. 4 provides droop control for current feeding inverters—i.e., in those embodiments where the power conditioners 110 comprise the droop control module 414, the power conditioners 110 are current feeding inverters.

The droop control module 414 comprises multipliers adders 420, 422, 436, 438, and 440, gain constant multipliers 424, 426, 428, 430, 432, 434, and 442, and subtractor 444. The gain constant multipliers 428, 430, 432, and 434 have gain constants X/Z, −R/Z, R/Z, and X/Z, respectively, which are set as previously described with respect to FIG. 3.

During autonomous mode operation of the power conditioner 110, the grid voltage Ugrid and the current being coupled to the grid by the power conditioner 110, Igrid, are fed to the PLL 412. Using the grid voltage Ugrid as a reference, the PLL 412 generates signals Ud and f, which respectively represent the peak value of the fundamental of the grid voltage Ugrid and the frequency of the grid voltage Ugrid, and couples the signals Ud and f to the respective adders 420 and 422. Additionally, the PLL 412 utilizes the current Igrid to calculate the portion of the output current that is in phase (Id) and quadrature (Iq) with the grid voltage Ugrid for use in determining P and Q, although in other embodiments P and Q may be determined by a different means, such as a Direct Fourier Transform (DFT) or a simple averaging scheme where P=average (Ugrid[n]*Igrid[n]), S=average(Ugrid[n])*average(Igrid[n]), and Q~sqrt($S^2-P^2$).

In addition to the signal Ud, the signal U0, which represents the target nominal voltage of the system (e.g., 240V AC or 230V AC), is coupled to the adder 420. The output from the adder 420 is coupled to the gain constant multiplier 424, which has a gain constant of ku, where the gain constant ku is the inverse of the gain constant kp described above with respect to FIG. 3. The output signal from the gain constant multiplier 424, Q', is coupled to the gain constant multipliers 428 and 432.

In addition to the signal f, the signal f0, which represents the target nominal frequency of the system (60 Hz or 50 Hz), is coupled to the adder 422. The output from the adder 422 is coupled to the gain constant multiplier 426, which has a gain constant of kf, where the gain constant kf is the inverse of the gain constant kq described above with respect to FIG. 3. The output signal from the gain constant multiplier 426, P', is coupled to the gain constant multipliers 430 and 434.

The output signals from the gain constant multipliers 428 and 430 are coupled to the adder 436 to generate the signal Q, which represents the reactive power component. The signal Q is coupled to the power conditioner control module 410.

The output signals from the gain constant multipliers 432 and 434 are coupled to the adder 438 to generate the signal P, which represents the real power component. The signal P is coupled to the adder 440. Additionally, a signal representing an SOC-based droop offset that is inversely proportional to the state of charge of the corresponding energy storage device 112 is coupled to the adder 440 for addition to the power term P. The SOC-based droop offset is obtained as described above with respect to FIG. 3; i.e., an SOC estimate signal and an SOC target signal are coupled to a subtractor 444, where the output of the subtractor 444 is coupled to the gain constant multiplier 442 to generate the SOC-based droop offset. The gain constant multiplier 442 has a gain constant or −kb as previously described. The resulting output signal from the adder 440, Poffset, is coupled to the power conditioner control module 410.

In some alternative embodiments, a computer readable medium comprises a program that, when executed by a processor, performs the steps described with respect to FIG. 4 for determining the power conditioner droop control such that autonomous charge balancing of the energy storage devices 112 is achieved.

Figure 5:
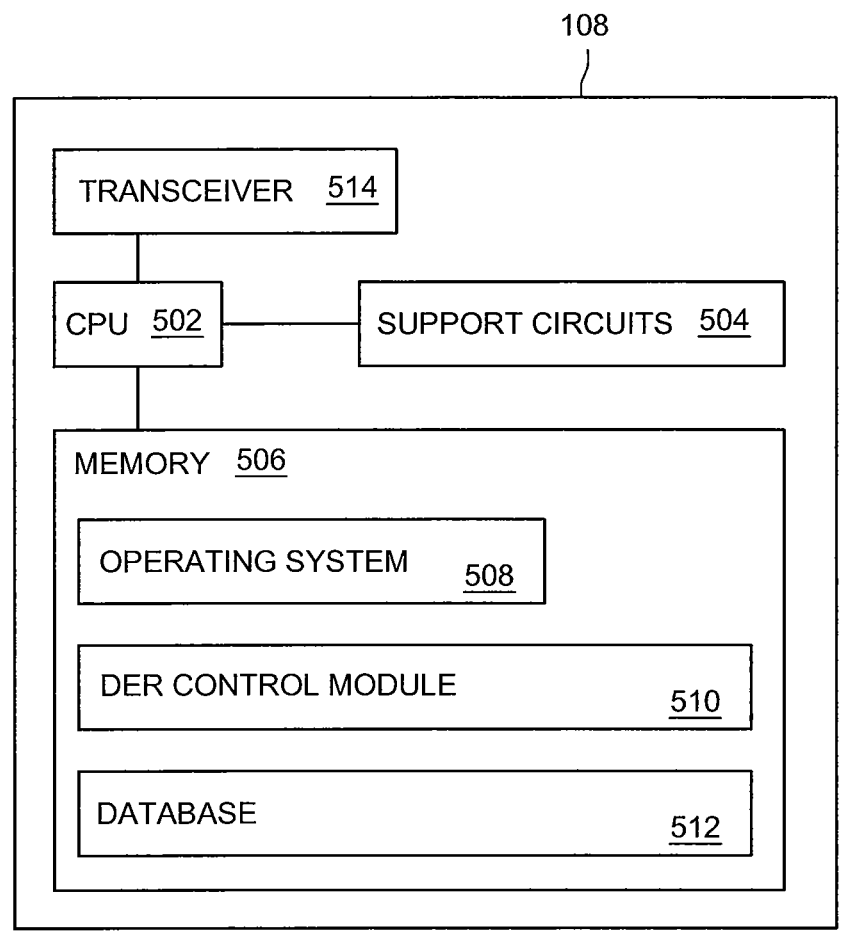
FIG. 5 is a block diagram of a DER controller in accordance with one or more embodiments of the present invention.

FIG. 5 is a block diagram of a DER controller 108 in accordance with one or more embodiments of the present invention. The DER controller 108 comprises a transceiver 514, support circuits 504 and a memory 506, each coupled to a central processing unit (CPU) 502. The CPU 502 may comprise one or more conventionally available microprocessors or microcontrollers; alternatively, the CPU 502 may include one or more application specific integrated circuits (ASICs). The DER controller 108 may be implemented using a general purpose computer that, when executing particular software, becomes a specific purpose computer for performing various embodiments of the present invention. In one or more embodiments, the CPU 502 may be a microcontroller comprising internal memory for storing controller firmware that, when executed, provides the controller functionality described herein.

The DER controller 108 generally communicates, via the transceiver 514, with the power conditioners 110 using power line communications (PLC), although additionally or alternatively the transceiver 514 may communicate with the power conditioners 110 using other types of wired and/or wireless communication techniques. In some embodiments, the DER controller 108 may further communicate via the transceiver 514 with other controllers within the microgrid and/or with a master controller (not shown).

The support circuits 504 are well known circuits used to promote functionality of the CPU 502. Such circuits include, but are not limited to, a cache, power supplies, clock circuits, buses, input/output (I/O) circuits, and the like.

The memory 506 may comprise random access memory, read only memory, removable disk memory, flash memory, and various combinations of these types of memory. The memory 506 is sometimes referred to as main memory and may, in part, be used as cache memory or buffer memory. The memory 506 generally stores the operating system (OS) 508, if necessary, of the power conditioner controller 140 that can be supported by the CPU capabilities. In some embodiments, the OS 508 may be one of a number of commercially available operating systems such as, but not limited to, LINUX, Real-Time Operating System (RTOS), and the like.

The memory 506 stores various forms of application software, such as a DER control module 510 for controlling operations pertaining to the DER 106 (e.g., collecting performance data for the power conditioners 110, generating control instructions for the power conditioners 110, and the like). The memory 506 additionally stores a database 512 for storing data related to the operation of the DER 106. In various embodiments, one or more of the DER control module 510 and the database 512, or portions thereof, are implemented in software, firmware, hardware, or a combination thereof.

Figure 6:
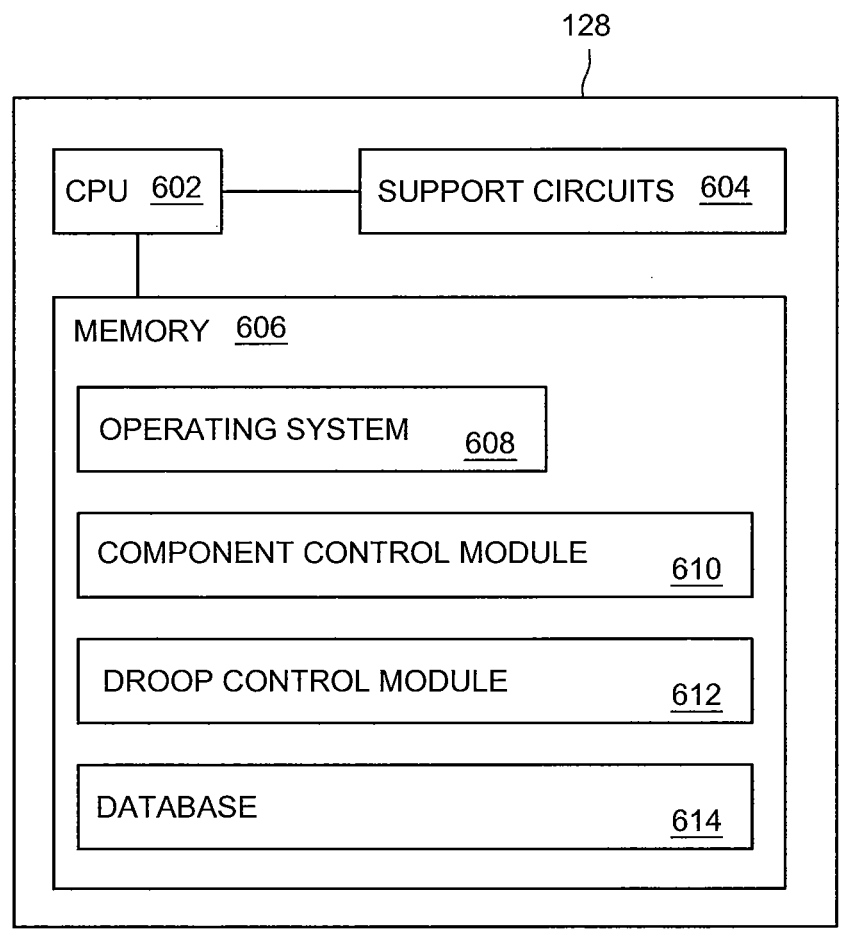
FIG. 6 is a block diagram of a component controller in accordance with one or more embodiments of the present invention.

FIG. 6 is a block diagram of a component controller 128 in accordance with one or more embodiments of the present invention. The component controller 128 comprises support circuits 604 and a memory 606, each coupled to a central processing unit (CPU) 602. The CPU 602 may comprise one or more conventionally available microprocessors or microcontrollers; alternatively, the CPU 502 may include one or more application specific integrated circuits (ASICs). The component controller 128 may be implemented using a general purpose computer that, when executing particular software, becomes a specific purpose computer for performing various embodiments of the present invention. In one or more embodiments, the CPU 602 may be a microcontroller comprising internal memory for storing controller firmware that, when executed, provides the controller functionality described herein.

The support circuits 604 are well known circuits used to promote functionality of the CPU 602. Such circuits include, but are not limited to, a cache, power supplies, clock circuits, buses, input/output (I/O) circuits, and the like.

The memory 606 may comprise random access memory, read only memory, removable disk memory, flash memory, and various combinations of these types of memory. The memory 606 is sometimes referred to as main memory and may, in part, be used as cache memory or buffer memory. The memory 606 generally stores the operating system (OS) 608, if necessary, of the component controller 128 that can be supported by the CPU capabilities. In some embodiments, the OS 608 may be one of a number of commercially available operating systems such as, but not limited to, LINUX, Real-Time Operating System (RTOS), and the like.

The memory 606 stores various forms of application software, such as a component control module 610 for controlling, when executed, one or more functions of the corresponding component, and a droop control module 612 for employing, when executed, droop control techniques for operating the component.

The memory 606 additionally stores a database 612 for storing data related to the component. In various embodiments, one or more of the component control module 610, the droop control module 612, and the database 614, or portions thereof, are implemented in software, firmware, hardware, or a combination thereof.

When a microgrid member 152 is disconnected from the local grid 132 and/or the utility grid 104, the power conditioner controllers 140 and the component controllers 128 facilitate automatic control of the corresponding components. For example, the power conditioner control module 210 and the droop control module 214, when executed, facilitate automatic control of the corresponding power conditioner 110; e.g., the power conditioner control module 210 may monitor the power line frequency and voltage at the corresponding power conditioner 110 to ensure that the frequency and voltage stay within designated parameters.

By using such localized droop control, each component can autonomously optimize its operation with respect to the microgrid member 152/overall microgrid 150. For example, for the generator 130, the component controller 128 may optimize the generation of power; for smart loads 118, and the component controller 128 may optimize the consumption of energy (e.g., by controlling the energy consumed by individual loads either through throttling the flow or turning on and turning off various loads at certain times).

While the foregoing is directed to embodiments of the present invention, other and further embodiments of the invention may be devised without departing from the basic scope thereof, and the scope thereof is defined by the claims that follow.

The invention claimed is:

1. An apparatus for autonomous charge balancing of an energy storage device of a microgrid, comprising:
   the energy storage device; and
   a power conditioner, coupled to the energy storage device, comprising a droop control module for operating the power conditioner, during an autonomous mode of operation, using a droop control technique such that the state of charge of the energy storage device is autonomously driven toward the state of charge of at least one other energy storage device of the microgrid.

2. The apparatus of claim 1, wherein operating the power conditioner such that the state of charge of the energy storage device is autonomously driven toward the state of charge of at least one other energy storage device of the microgrid comprises operating the power conditioner to have a droop offset based on the state of charge of the energy storage device.

3. The apparatus of claim 2, wherein the droop offset is further based on a predetermined state of charge target.

4. The apparatus of claim 2, wherein the droop offset is inversely proportional to state of charge of the energy storage device.

5. The apparatus of claim 2, wherein the power conditioner is a DC-AC inverter.

6. The apparatus of claim 5, wherein the DC-AC inverter is a voltage forming inverter.

7. The apparatus of claim 5, wherein the DC-AC inverter is a current feeding inverter.

8. The apparatus of claim 1, wherein the energy storage device is a battery.

9. A system for autonomous charge balancing of a plurality of energy storage devices of a microgrid, comprising:
   the plurality of energy storage devices; and
   a plurality of power conditioners coupled via a power bus and coupled to the plurality of energy storage devices in a one-to-one correspondence, wherein each power conditioner comprises a droop control module for operating the power conditioner during an autonomous mode of operation, and wherein during the autonomous mode of operation the plurality of power conditioners are operated using a droop control technique such that the states of charge of the plurality of energy storage devices are autonomously driven toward being equal.

10. The system of claim 9, wherein operating the power conditioner during an autonomous mode of operation comprises operating the power conditioner to have a droop offset based on the state of charge of the corresponding energy storage device.

11. The system of claim 10, wherein the droop offset is further based on a predetermined state of charge target.

12. The system of claim 11, wherein the predetermined state of charge target is the same for each energy storage device of the plurality of energy storage devices.

13. The system of claim 10, wherein the droop offset is inversely proportional to state of charge of the corresponding energy storage device.

14. The system of claim 10, wherein each power conditioner of the plurality of power conditioners is a DC-AC inverter.

15. The system of claim 14, wherein the DC-AC inverter is a voltage forming inverter.

16. The system of claim 14, wherein the DC-AC inverter is a current feeding inverter.

17. The system of claim 9, wherein each energy storage device of the plurality of energy storage devices is a battery.

18. The system of claim 9, wherein the microgrid further comprises at least one additional power conditioner coupled to the power bus and coupled to a corresponding energy source.

19. The system of claim 18, wherein the corresponding energy source is a renewable energy source.

20. The system of claim 18, wherein the corresponding energy source is a photovoltaic (PV) module.

\* \* \* \* \*